US009353338B2

(12) United States Patent
Darrow

(10) Patent No.: US 9,353,338 B2
(45) Date of Patent: May 31, 2016

(54) WHITE CARBON BLACK FORMULATIONS AND METHODS

(71) Applicant: Richard Darrow, Denville, NJ (US)

(72) Inventor: Richard Darrow, Denville, NJ (US)

(*) Notice: Subject to any disclaimer, the term of this patent is extended or adjusted under 35 U.S.C. 154(b) by 81 days.

(21) Appl. No.: 14/028,902

(22) Filed: Sep. 17, 2013

(65) Prior Publication Data

US 2014/0075700 A1 Mar. 20, 2014

Related U.S. Application Data

(60) Provisional application No. 61/701,894, filed on Sep. 17, 2012.

(51) Int. Cl.

| | |
|---|---|
| ***B08B 7/00*** | (2006.01) |
| ***C11D 7/14*** | (2006.01) |
| ***B08B 1/00*** | (2006.01) |
| ***C11D 7/02*** | (2006.01) |
| ***C11D 7/20*** | (2006.01) |
| ***C11D 17/04*** | (2006.01) |
| ***G02B 27/00*** | (2006.01) |

(52) U.S. Cl.

CPC ... *C11D 7/14* (2013.01); *B08B 1/00* (2013.01); *B08B 1/006* (2013.01); *C11D 7/02* (2013.01); *C11D 7/20* (2013.01); *C11D 17/041* (2013.01); *G02B 27/0006* (2013.01); *B08B 1/002* (2013.01)

(58) Field of Classification Search

CPC .......... B08B 1/00; B08B 1/002; B08B 1/006; C11D 7/02; C11D 7/14

See application file for complete search history.

(56) References Cited

U.S. PATENT DOCUMENTS

| | | | | |
|---|---|---|---|---|
| 3,711,884 | A | 1/1973 | Feig | |
| 5,043,090 | A | 8/1991 | Camp et al. | |
| 5,375,378 | A * | 12/1994 | Rooney | 451/38 |
| 5,993,560 | A * | 11/1999 | Wasak et al. | 134/6 |
| 6,120,361 | A | 9/2000 | Konishi et al. | |
| 7,959,902 | B1 * | 6/2011 | Postlewaite | 424/49 |
| 2005/0142815 | A1 | 6/2005 | Miyazaki et al. | |
| 2007/0175403 | A1 | 8/2007 | Wang et al. | |
| 2011/0124754 | A1 | 5/2011 | Alteheld et al. | |
| 2015/0000699 | A1 * | 1/2015 | Kelsey | 134/6 |

FOREIGN PATENT DOCUMENTS

| | | | |
|---|---|---|---|
| WO | WO2012021962 | * | 2/2012 |

* cited by examiner

*Primary Examiner* — Bibi Carrillo

(57) ABSTRACT

Compositions, method, and devices are provided for cleaning surfaces, including glass and plastic surfaces. The compositions include white carbon black. The white carbon black can be combined with a binder to form a white carbon black formulation. The white carbon black formulation can be used to clean various glass and plastic surfaces, including transparent surfaces.

11 Claims, 3 Drawing Sheets

WHITE CARBON BLACK FORMULATIONS AND METHODS

CROSS-REFERENCE TO RELATED APPLICATIONS

This application claims the benefit of U.S. Provisional Patent Application No. 61/701,894, filed Sep. 17, 2012, which is incorporated by reference herein.

FIELD OF THE INVENTION

This disclosure relates to compositions, methods, and devices for cleaning surfaces, particularly glass or plastic surfaces.

BACKGROUND

There are numerous plastic and glass surfaces that require frequent cleaning for satisfactory performance and clarity, including, but not limited to, camera lenses, microscope lenses, telescope lenses, and surfaces in other products. It is often important for these surfaces to remain relatively scratch free and damage free.

Conventional cleaning apparatuses such as brushes, cloths, and blowers for cleaning such surfaces can become contaminated with dust, fingerprints, and/or other debris, thereby resulting in inefficient cleaning and/or damage to the surfaces. The use of cleaning solutions with special cloths adds cost and complexity to surface cleaning.

Carbon black, sometimes referred to as "soot," has been used for cleaning optical surfaces. For example, U.S. Pat. No. 5,993,560 to Wasak, et al. discloses devices and compositions for cleaning optical surfaces with carbon black. Carbon black and its use, however, can be disadvantageous for one or more reasons. Carbon black may leave a fine black carbon residue on an optical surface, the cleaning equipment, and/or the user's hands or clothes. As a result, carbon black may require special handling or further cleaning steps.

Products and method are desired that clean plastic and glass surfaces without one or more of the disadvantages associated with carbon black.

BRIEF SUMMARY

Compositions, methods, and devices are provided for cleaning glass and plastic surfaces, including transparent surfaces. Compositions are provided comprising a white carbon black formulation that includes at least one white carbon black and at least one binder.

Methods are provided for producing a cleaning composition comprising combining at least one white carbon black and at least one binder in an amount of liquid sufficient to form a suspension of the at least one white carbon black and the at least one binder, and removing at least a portion of the liquid to produce a white carbon black formulation.

Methods are provided for cleaning a surface comprising contacting a surface with a white carbon black formulation, wherein the white carbon black formulation comprises at least one white carbon black and at least one binder.

Devices are provided for cleaning a surface comprising an applicator tip comprising a substrate, and a white carbon black formulation, wherein the white carbon black formulation is disposed on the substrate.

DESCRIPTION

Figure 1:
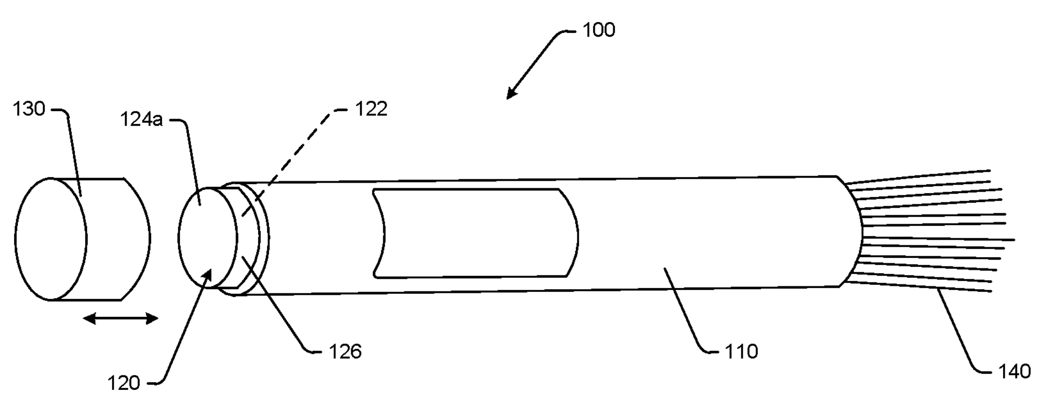
FIG. 1 is an isometric view of one embodiment of an applicator device.

Other objects, features, and advantages of the invention will be apparent from the following detailed description, drawings, and claims. Unless otherwise defined, all technical and scientific terms and abbreviations used herein have the same meaning as commonly understood by one of ordinary skill in the art to which this invention pertains. Although methods and compositions similar or equivalent to those described herein can be used in the practice of the present invention, suitable methods and compositions are described without intending that any such methods and compositions limit the invention herein.

White Carbon Black

As used herein, the phrase "white carbon black" generally refers to any substance that is an acceptable substitute for carbon black. An acceptable substitute for carbon black performs substantially the same functions as would carbon black. Carbon black has numerous uses and any material other than carbon black that can be used in place of carbon black is referred to herein as "white carbon black." White carbon black, as the phrase is used herein, may refer to materials that are white, transparent, or translucent. Therefore, as used herein, the phrase "white carbon black" encompasses white carbon black, transparent carbon black, and translucent carbon black, unless explicitly noted otherwise.

There are various types of white carbon black, and this disclosure is not limited to any particular type. White carbon black, as used herein, can include a single substance or a combination of substances.

In one embodiment, the white carbon black is silicon dioxide. The silicon dioxide, in some embodiments, is hydrated silica ($SiO_2.nH_20$). Generally, any form of hydrated silica may be used.

The white carbon black may be in any physical form, size, or shape that is suitable for the uses and processes described herein. The white carbon black may be a powder or gel. For example, the white carbon black may be a fine powder, an ultra-fine powder, a white powder gel, or an ultra-fine aero gel. Generally, the particle size of the white carbon black may be lessened or increased if the white carbon black scratches certain surfaces or fails to clean certain surfaces, respectively.

In some embodiments, white carbon black is used in the methods and devices provided herein. For example, surfaces may be cleaned with white carbon black that has not been combined with another additive, such as a binder. White carbon black can be applied alone or with the aid of another material, such as a cloth, chamois, applicator device, etc. The applicator device may be a foam-like material, such as a sponge.

Binders

The white carbon black may be mixed with one or more binders to form a white carbon black formulation. Generally, a binder may be any substance that is compatible with white carbon black. The term "binder," as used herein, refers to any binder or combination of binders that are mixed with or used with white carbon black. The binder, in some embodiments, is a caking agent.

In one embodiment, the binder is calcium sulfate dihydrate. In another embodiment, the binder is synthetic aluminum. In yet another embodiment, the binder is calcium. In still another embodiment, the binder is carbon black. A combination of any of these binders also may be used.

The binders may be in any physical form, size, or shape that is suitable for the uses and processes described herein. In some embodiments, the binders may be a powder or gel.

In one embodiment, two or more binders of different colors are combined. This technique may produce a binder or white carbon black formulation of a desired color.

White Carbon Black Formulations

The phrase "white carbon black formulation," as used herein, refers to combinations of at least one white carbon black and at least one binder. The white carbon black formulations described herein may include one or more other substances, such as an additive.

The white carbon black formulations may be used to clean any suitable surface. For example, the white carbon black formulations may be used to clean any plastic or glass surface, including transparent surfaces. Transparent surfaces can include optical surfaces, such as camera lenses, telescope lenses, binoculars lenses, etc.

The white carbon black formulations can be applied alone or with the aid of another material, such as a cloth, chamois, applicator device, etc. The applicator device may be a foam-like material, such as a sponge.

In one embodiment, the white carbon black formulation includes from about 70% to about 90% by weight at least one binder and from about 10% to about 30% by weight at least one white carbon black. In another embodiment, the white carbon black formulation includes from about 75% to about 85% by weight at least one binder and from about 15% to about 25% by weight at least one white carbon black. In one embodiment, the white carbon black formulation includes about 20% by weight at least one white carbon black and about 80% by weight at least one binder.

In one embodiment, the white carbon black formulation comprises silicon dioxide and calcium sulfate dihydrate. In some embodiments, the white carbon black formulation includes from about 70% to about 90% by weight calcium sulfate dihydrate and from about 10% to about 30% by weight silicon dioxide. In other embodiments, the white carbon black formulation includes from about 75% to about 85% by weight calcium sulfate dihydrate and from about 15 to about 25% by weight silicon dioxide. In one embodiment, the white carbon black formulation includes about 80% by weight calcium sulfate dihydrate and about 20% by weight silicon dioxide. The silicon dioxide and calcium sulfate dihydrate may be in powder form.

In one embodiment, the white carbon black formulation includes from about 70% to about 90% by weight at least one white carbon black and from about 10% to about 30% by weight at least one binder. In another embodiment, the white carbon black formulation includes from about 75% to about 85% by weight at least one white carbon black and from about 15% to about 25% by weight at least one binder. In one embodiment, the white carbon black formulation includes about 20% by weight at least one binder and about 80% by weight at least one white carbon black.

In one embodiment, the white carbon black formulation consists essentially of at least one white carbon black and at least one binder. In other words, the white carbon black formulation of this embodiment includes at least one white carbon black, at least one binder, and optionally one or more other ingredients that do not materially affect the basic and novel properties of the white carbon black formulation.

The white carbon black formulations may be made by any process that combines the at least one white carbon black and at least one binder.

In one embodiment, the white carbon black formulation is made by combining and mixing, via stirring, at least one white carbon black and at least one binder. The at least one white carbon black and at least one binder may be in powder form.

In one embodiment, the white carbon black formulation is made by combining and mixing, via stirring, at least one white carbon black and at least one binder to form a mixture, and then adding a liquid in an amount sufficient to suspend the mixture. Suspending the mixture may require stirring. In some embodiments, at least 10 minutes of stirring may be required to form the suspension. In other embodiments, at least 2 hours of stirring may be required to form the suspension. The suspension may be applied to an applicator. For example, the applicator may be soaked in the suspension. After soaking, the liquid can be removed from the applicator by any suitable means. The applicator may be heated to remove the liquid. For example, the applicator can be heated to about 50° C. for about 1.5 hours. The liquid used to form the suspension can include water, acetone, isopropyl alcohol, or a combination thereof. Any other suitable solvent may be used. The suspension may be a colloidal slurry or emulsion.

The white carbon black formulations may include one or more additives, including, but not limited to, an anti-bacterial agent and/or an anti-fog agent.

Applicator Device

The white carbon formulations may be applied with an applicator device. The applicator devices provided herein may be used to apply, transport, and/or store the white carbon black formulations.

In some embodiments, the applicator device includes an applicator tip. In other embodiments, the applicator device includes an applicator tip and a body. The body may house the applicator tip.

The applicator tip carries a portion of white carbon black or a white carbon black formulation. In some embodiments, the applicator tip includes a substrate which hosts the white carbon black or white carbon black formulation. In other embodiments, the applicator tip includes a substrate, which hosts the white carbon black or white carbon black formulation, and a base. The substrate may be disposed on the base.

The substrate can be made from a cloth, chamois, foam, foam-like material, leather material, or other material that can host the white carbon black or white carbon black formulation while not damaging the surfaces that are cleaned. In one embodiment, the substrate is a microfiber cloth. In another embodiment, the substrate is a sponge.

The base may be a compressible and/or resilient material. For example, the base may be made of a compressible and/or resilient foam. In one embodiment, the base is made of polyurethane foam. In another embodiment, the base is made of rubber.

In some embodiments, the base includes a recess. In particular embodiments, the recess is shaped and sized to conform easily to the surface to be cleaned (such as a camera lens or other optical surface) when the applicator tip is applied or pressed against the surface to be cleaned. In one embodiment, the recess is dish-shaped. In another embodiment, the recess is concave. The substrate may be disposed on the base at least in the region of the recess.

The applicator tip may be shaped in numerous ways to improve the performance, look, or feel of the applicator device. The shape of the applicator tip may be imparted by the shape of the substrate, the base, and/or the white carbon black or white carbon black formulation.

In embodiments, the applicator tip may be elliptical, round, oval, polygonal, asymmetric, conical, etc. Any shape may be acceptable that facilitates cleaning various surfaces. In one embodiment, the applicator tip is shaped to facilitate cleaning convex optical surfaces. The different portions of the applicator tip may have different shapes. For example, the applicator tip's tip surface may be rounded and the sidewalls adjacent to the tip surface may be relatively flat.

The body of the applicator device may be of any suitable shape, including shapes that are ergonomic and suitable for easy handling. In one embodiment, the body is shaped and sized to fit comfortably in a user's hand. In another embodiment, the body is shaped like a conventional pen or other writing instrument.

The body may be at least partially hollow and contain one or more storage compartments. The body may store additional portions of white carbon black formulation or white carbon black, additional applicator tips, and/or accessories. In one embodiment, the body stores at least one additional portion of white carbon black formulation or white carbon black, which can be used to replenish and/or maintain the applicator tip.

The body may include a particle remover, such as a brush. The particle mover may be detachably affixed to the body. The particle mover may be at least partially retractable into the body with a suitable feature, such as a slider button.

The body also may include a clip, tether, or other feature for fastening the applicator device to a desired object, such as the user's clothing, bag, hand, wrist, etc.

The applicator device may include one or more caps. The one or more caps may be detachably affixed to the applicator device, and can include a tether or other feature that attaches the one or more caps to the body of the applicator device. A cap may at least partially cover the applicator tip when the applicator device is not in use. The cap may prevent contamination and/or degradation of the applicator tip. A cap may at least partially cover any of the accessories described herein, for example, a brush.

The cap may be designed to replenish or maintain the white carbon black or white carbon black formulation of the applicator tip when the cap is placed on or over the applicator tip. In some embodiments, the cap includes a second portion of white carbon black formulation or white carbon black. The second portion of white carbon black formulation or white carbon black can be positioned in the cap so that the second portion of white carbon black formulation or white carbon black contacts at least a portion of the applicator tip when the cap is placed on or over the applicator tip. The second portion of white carbon black formulation or white carbon black may be in semi-solid or cake form.

The semi-solid or cake form second portion of white carbon black formulation or white carbon black may be disposed on a resilient material within the cap. The resilient material may be made of polyurethane or another foam or foam-like material. In one embodiment, the resilient material is shaped and/or configured so that it is compressed by the applicator tip when the cap is placed on or over the applicator tip. When the applicator tip contacts the second portion of white carbon black formulation or white carbon black, the white carbon black formulation or white carbon black can be replenished and/or maintained by the second portion of the white carbon black formulation or white carbon black, thereby extending the service life of the applicator device.

The semi-solid or cake form second portion of white carbon black formulation or white carbon black may have a shape that substantially corresponds to the shape of at least a portion of the applicator tip or the recess of the applicator tip. In one embodiment, the semi-solid or cake form second portion of white carbon black formulation or white carbon black has an outwardly-facing convex or protruding shape. The outwardly-facing convex or protruding shape may be configured to conform to a concave recess in the applicator tip so that the second portion of white carbon black formulation or white carbon black replenishes the white carbon black formulation or white carbon black of the applicator tip when the cap is placed on or over the applicator tip.

The second portion of white carbon black formulation or white carbon black may be formed in a semi-solid, cake, paste, or other cohesive form.

The second portion of white carbon black formulation or white carbon black may be supported by a second applicator tip. In one embodiment, the second portion of white carbon black formulation or white carbon black is in powder form and supported by a second applicator tip. The second applicator tip can include a substrate and a base, or a substrate. The substrate and base of the second applicator tip may be made of the same materials as the substrate and base of the first applicator tip or different materials. The base of the second applicator tip may be made of a resilient material.

FIG. 1 is an isometric view of an apparatus 100 for cleaning plastic or glass surfaces according to one embodiment. In this particular embodiment, the apparatus 100 includes a cylindrical body 110 having a cleaning agent or cleaning substance applicator tip 120 positioned toward a first end portion, and a particle remover or brush 140 positioned toward an opposite second end portion. The apparatus also includes a removable cap 130 that is removably secured to the end portion of the apparatus 100 over the applicator tip 120.

Figure 2:
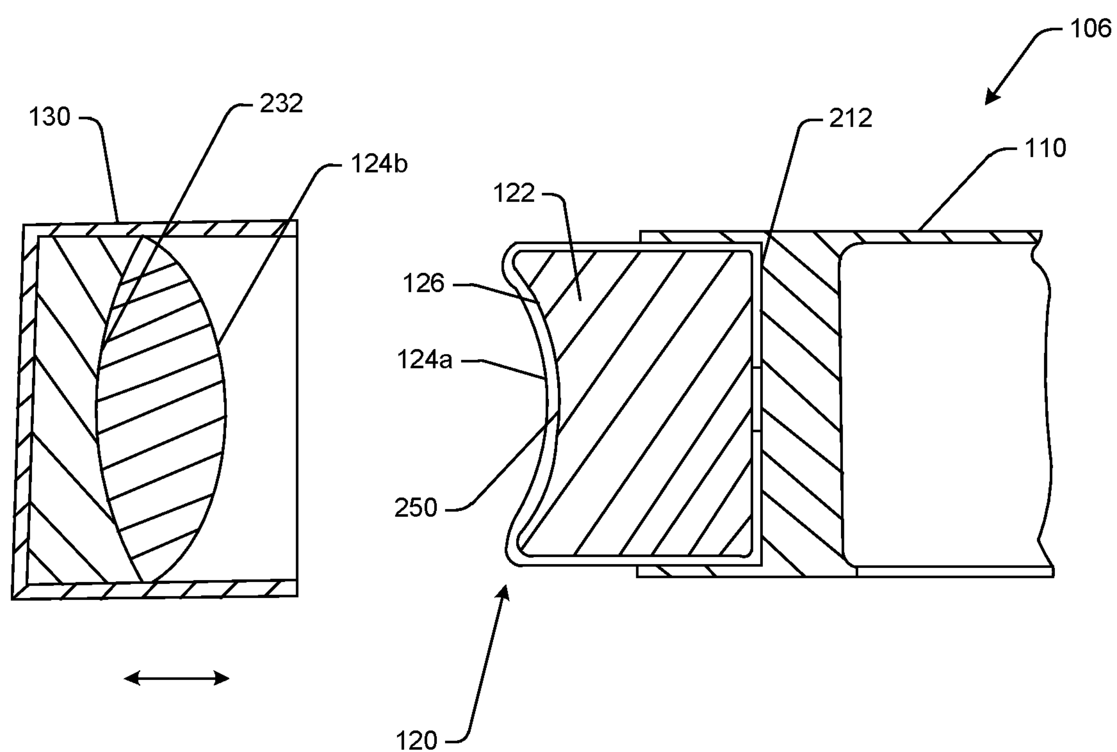
FIG. 2 is a cross-sectional view of one embodiment of an applicator tip.

FIG. 2 is an enlarged cross-sectional view of the applicator tip 120 and corresponding cap 130 from FIG. 1. In this embodiment, the resilient base 122 is securely disposed in a recess 212 formed in a distal end portion of the body 110. The resilient base 122 is composed of a compressible and resilient foam having a dish-shaped recess 250 formed in a distal end portion thereof. The dish-shaped recess 250 is shaped and sized to conform easily to the surface of a particular camera lens or other optical surface when the applicator tip 120 is gently pressed against the surface for cleaning. The cap 130 is sized to fit snugly over the applicator tip 120 and removably attach to the distal end portion of the body 110. The cap 130 also includes a second portion of white carbon black formulation **124*b* in semi-solid or "cake" form supported by a resilient carrier 232. The second portion of cleaning substance 124*b* has an outwardly-facing protruding shape configured to conform to the concave recess 250 in the applicator base 122 so that it replenishes the layer of white carbon black formulation (i.e. the first portion of cleaning substance 124*a*) on the substrate 126 when the cap 130 is fully installed over the applicator tip 120**.

To use the apparatus 100 shown in FIGS. 1 and 2, the brush 140 is first used to remove dust and other loose debris from the surface to be clean. The cap 130 is then removed and the applicator tip 120 is pressed gently against the surface and moved around the surface so that the first portion of cleaning substance **124*a* (e.g., white carbon black formulation) on the substrate 126 can contact and clean the surface. The cap 130** can be replaced after the surface has been sufficiently cleaned. Cleaning may be preceded or supplemented by other steps if desirable or necessary.

Figure 3A:
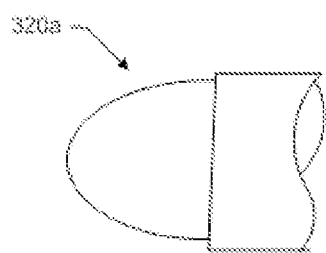
FIGS. 3A-3C depict several applicator tips of various shapes.
Figure 3B:
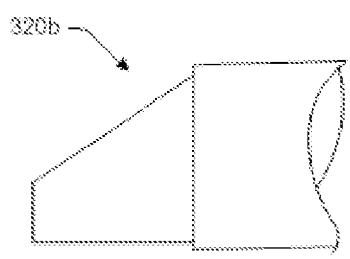
Figure 3C:
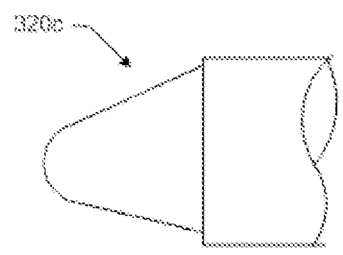

As described herein, the applicator tips of the apparatuses may have a number of shapes. Suitable examples are shown in FIGS. 3A-3C, which depict three different white carbon black formulation applicator tip portions (**320*a*, 320*b*, 320*c***) having substantially an elliptical, triangular, and conical shape, respectively.

EXAMPLES

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims. Thus, other aspects of this invention will be apparent to those skilled in the art from consideration of the specification and practice of the invention disclosed herein.

Example 1

Preparation of White Carbon Black Formulation

In this embodiment, silicon dioxide was used as white carbon black to make a white carbon black formulation. The white carbon black formulation was made by mixing silicon dioxide (20% by weight) and calcium sulfate dihydrate (80% by weight). The two powders were stirred with a magnetic stirrer for 10 minutes. Both were purchased from Sigma-Aldrich.

Distilled water was then added to the mixture of silicon dioxide and calcium sulfate dihydrate until the entire mixture was suspended. The resulting suspension was stirred for 45 minutes to create a colloidal slurry.

Into the colloidal slurry, several sponges were added and soaked until saturated. Instead of a sponge, chamois, felt, or velvet may be used. The sponges were then baked in an environmental chamber for several hours at 50° C. and 0% humidity. By this process, the sponges were infused with the white carbon black formulation, and the sponges shed the white carbon black formulation with ease.

Example 2

Evaluation and Comparison of White Carbon Black Formulation and Carbon Black The physical characteristics of the white carbon black formulation of Example 1 and carbon black were evaluated and compared. The physical characteristics (supplier provided) are listed in the following table.

TABLE 1

Physical Characteristics of White Carbon Black Formulation and Carbon Black

| Characteristic | White Carbon Black Formulation | Carbon Black |
|---|---|---|
| Particle Size | 5-15 nm | ~5 nm |
| Surface Area | 300 $m^2$/gram | 500 $m^2$/gram |
| Hardness - Mohs Scale | 7 | 1.5 (graphite structure) |
| Oil Absorption | 2-3.5 $cm^3$/gram | 0.5-1.5 $cm^3$/gram |

The white carbon black formulation and carbon black were also viewed under 26,000× magnification. Both materials appeared to have similar particle sizes, and tended to clump in a similar fashion.

Example 3

Cleaning Efficacy

The cleaning efficacy of the white carbon black formulation of Example 1 was tested by comparing the cleaning efficacy of the white carbon black formulation and carbon black against a control group cleaned with only a chamois. In this example, three glass surfaces were contaminated with a very fine coat of lard to represent a worst-case scenario, and then cleaned. The three glass surfaces were cleaned for 10 seconds with (1) a sponge treated with the white carbon black formulation (Example 1), (2) a sponge treated with carbon black, and (3) an untreated sponge (control).

The contamination of the glass surfaces was measured (1) before the lard was introduced, (2) after the lard was introduced, and (3) after the lard was cleaned using ASTM C813-90, which is a test method for hydrophobic contaminates.

This method relied on the hydrophobic properties of contaminates to determine the presence of contamination. A droplet was placed on the three glass surfaces, and the angle at the point of contact, i.e., the side of the droplet, was measured. The cleaner glass surfaces hosted flatter, i.e., more dispersed, water droplets, while the more contaminated glass surfaces hosted water droplets with higher inclusive angles. Two different drop sizes were used to verify contamination on each of the three glass surfaces in view of the uneven surfaces. The measurements are shown in the following table.

TABLE 2

Water Droplet Angles (ASTM C813-90)

| Glass Test Piece | Cleaning Method | Left .02 mL | Right .02 mL | Left .002 mL | Right .002 mL | Avg. |
|---|---|---|---|---|---|---|
| Sterilized Slate | Chamois (control) | 10° | 15° | 20° | 20° | 16.25° |
| | Carbon Black | 15° | 15° | 15° | 20° | 16.25° |
| | White Carbon Black Formulation | 15° | 10° | 15° | 10° | 12.5° |
| Dirty Slate | Chamois (control) | 40° | 35° | 45° | 50° | 42.5° |
| | Carbon Black | 60° | 45° | 75° | 65° | 61.25° |
| | White carbon black formulation | 45° | 45° | 75° | 80° | 61.25° |
| Cleaned Slate | Chamois (control) | 35° | 35° | 40° | 35° | 36.25° |
| | Carbon Black | 25° | 25° | 30° | 30° | 27.5° |
| | White carbon black formulation | 30° | 30° | 30° | 30° | 30° |

Example 4

Lens Surface Evaluation

A scanning electron microscope in a variable pressure mode was used to evaluate the surface condition of the lenses that were cleaned with the white carbon black formulation of Example 1 and carbon black. The scanning electron microscope in a variable pressure mode permitted imaging the glass without sputter coating. Occasionally, images were sampled for elemental makeup to evaluate contaminates further.

An image was taken of an untouched iPhone® surface. The image revealed micro scratches. The amount of scratches was not increased notably after the iPhone® was cleaned with carbon black. Also, there was not a noticeable increase in surface scratching when the iPhone® was cleaned with the white carbon black formulation of Example 1. The images demonstrated that the white carbon black formulation of Example 1, like carbon black, did not noticeably scratch or damage the surface of the iPhone®.

An image also was taken of a clean, coated UV lens filter. The clean, coated UV lens filter was then contaminated as in the previous example, and cleaned with either carbon black or the white carbon black formulation of Example 1 before another image was taken.

The image of the lens cleaned with the white carbon black formulation of Example 1 showed no evidence of finger-print residue. Also, a single particle of the white carbon black formulation of Example 1 appeared on the lens filter.

The image of the lens cleaned with carbon black also showed no evidence of finger-print residue, but there were a few remaining particles of carbon black on the lens filter.

Example 5

Elastomer Staining

The elastomers around the iPhone® screens cleaned in Example 4 were analyzed under 200× magnification. The elastomer of the iPhone® cleaned with carbon black and brushed was stained because the carbon black failed to brush off of the elastomer. The elastomer of the iPhone® cleaned with the white carbon black formulation of Example 1, however, did not have any residual white carbon black formulation. The elastomer of the iPhone® cleaned with the white carbon black formulation of Example 1 was slightly discolored, but it was believed that the discoloration was caused by offset material from the chamois pad used to apply the white carbon black formulation.

Other objects, features, and advantages of the invention will be apparent from the detailed description, drawings, and claims. Unless otherwise defined, all technical and scientific terms and abbreviations used herein have the same meaning as commonly understood by one of ordinary skill in the art to which this invention pertains. Although methods and compositions similar or equivalent to those described herein can be used in the practice of the present invention, suitable methods and compositions are described without intending that any such methods and compositions limit the invention herein.

I claim:

1. A device for cleaning a surface comprising:

an applicator tip comprising a substrate and a base onto which the substrate is disposed, and a first portion of a white carbon black formulation comprising at least one white carbon black and at least one binder, the at least one white carbon black comprising silicon dioxide, wherein the first portion of the white carbon black formulation is disposed on the substrate, and the at least one binder comprises calcium sulfate dihydrate and is present in the white carbon black formulation in an amount of from about 70% to about 90% by weight, and the silicon dioxide is present in the white carbon black formulation in an amount of from about 10% to about 30% by weight.

2. The device according to claim 1, wherein the base comprises a compressible or resilient foam.

3. The device according to claim 1, wherein the substrate comprises a chamois.

4. The device according to claim 1, wherein the substrate comprises a microfiber cloth.

5. The device according to claim 1, wherein the device further comprises a body that houses the applicator tip.

6. The device according to claim 1, wherein the device further comprises a brush.

7. The device according to claim 1, wherein the device further comprises a cap.

8. The device according to claim 1, wherein the silicon dioxide comprises hydrated silica.

9. The device according to claim 5, wherein the body comprises one or more storage compartments.

10. The device according to claim 7, wherein the cap comprises a second portion of the at least one white carbon black formulation.

11. The device according to claim 10, wherein the second portion of the at least one white carbon black formulation is configured to replenish the first portion of the at least one white carbon black formulation when the cap is placed on or over the applicator tip.

* * * * *